United States Patent [19]

Mattingly

[11] Patent Number: 5,205,547

[45] Date of Patent: Apr. 27, 1993

[54] WAVE SPRING HAVING UNIFORMLY POSITIONED PROJECTIONS AND PREDETERMINED SPRING

[76] Inventor: William R. Mattingly, 14162 Brenan Way, Santa Ana, Calif. 92705

[21] Appl. No.: 932,273

[22] Filed: Aug. 19, 1992

Related U.S. Application Data

[63] Continuation of Ser. No. 647,956, Jan. 30, 1991, abandoned.

[51] Int. Cl.$^5$ ................... F16F 1/34; H01R 13/635
[52] U.S. Cl. ................... 267/158; 267/161; 439/318
[58] Field of Search ............ 267/158, 159, 161, 162, 267/164, 165; 285/361; 439/293, 294, 318, 319

[56] References Cited

U.S. PATENT DOCUMENTS

| | | | |
|---|---|---|---|
| 2,229,120 | 1/1941 | Nordrstrom | 267/158 |
| 2,431,120 | 11/1947 | Howe | 267/161 |
| 2,747,166 | 5/1956 | Hoffarth | 267/161 |
| 3,114,388 | 12/1963 | Hoen | 267/161 |
| 3,375,046 | 3/1968 | Marley | 384/105 |
| 3,470,524 | 9/1969 | Culver | 285/361 |
| 3,591,162 | 7/1971 | Bauer | 267/161 |
| 3,594,700 | 7/1971 | Nava | 285/81 |
| 3,674,251 | 7/1972 | Tirabassi | 267/162 |
| 3,748,888 | 7/1973 | Gerich | 267/159 |
| 3,884,457 | 5/1975 | Leko | 267/162 |
| 4,082,375 | 4/1978 | Fortmann | 384/105 |
| 4,165,910 | 8/1979 | Anderson | 439/318 |
| 4,196,895 | 4/1980 | Sullivan | 267/158 |
| 4,629,272 | 12/1986 | Mattingly et al. | 439/318 |
| 4,668,106 | 5/1987 | Gu | 267/161 |
| 4,711,434 | 12/1987 | Haag | 267/161 |
| 4,871,267 | 10/1989 | Gu | 384/106 |
| 5,013,199 | 5/1991 | Downes | 267/161 |

FOREIGN PATENT DOCUMENTS 1806274  5/1970  Fed. Rep. of Germany ...... 267/161

Primary Examiner—Joseph F. Peters, Jr.
Assistant Examiner—Virna Lissi Ansley
Attorney, Agent, or Firm—Robbins, Dalgarn, Berliner & Carson

[57] ABSTRACT

A wave spring having uniformly positioned surface projections and predetermined consistent spring tension deflection is disclosed. The wave spring includes; a spring ring having projections in the ring's radial wall at predetermined positions within the wall thereby producing a wave spring having specific predetermined spring tension deflecting in response to specific loads. Deflection capability is maintained due to the position and heights of the projections. A wave spring which can be utilized in bayonet or non-bayonet style electrical connectors to provide a specified and predetermined spring tension deflection is also disclosed. A method of fabrication for a wave spring having uniformly positioned surface projections and predetermined consistent spring tension deflection is also described.

21 Claims, 2 Drawing Sheets

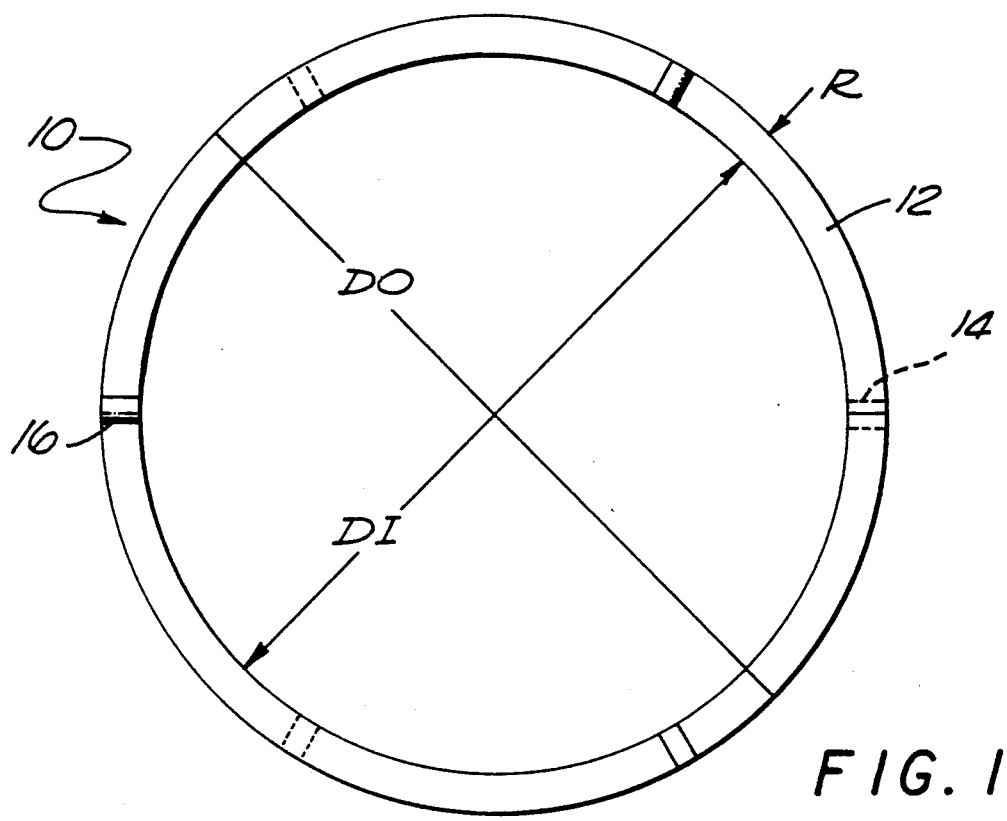
FIG. 1
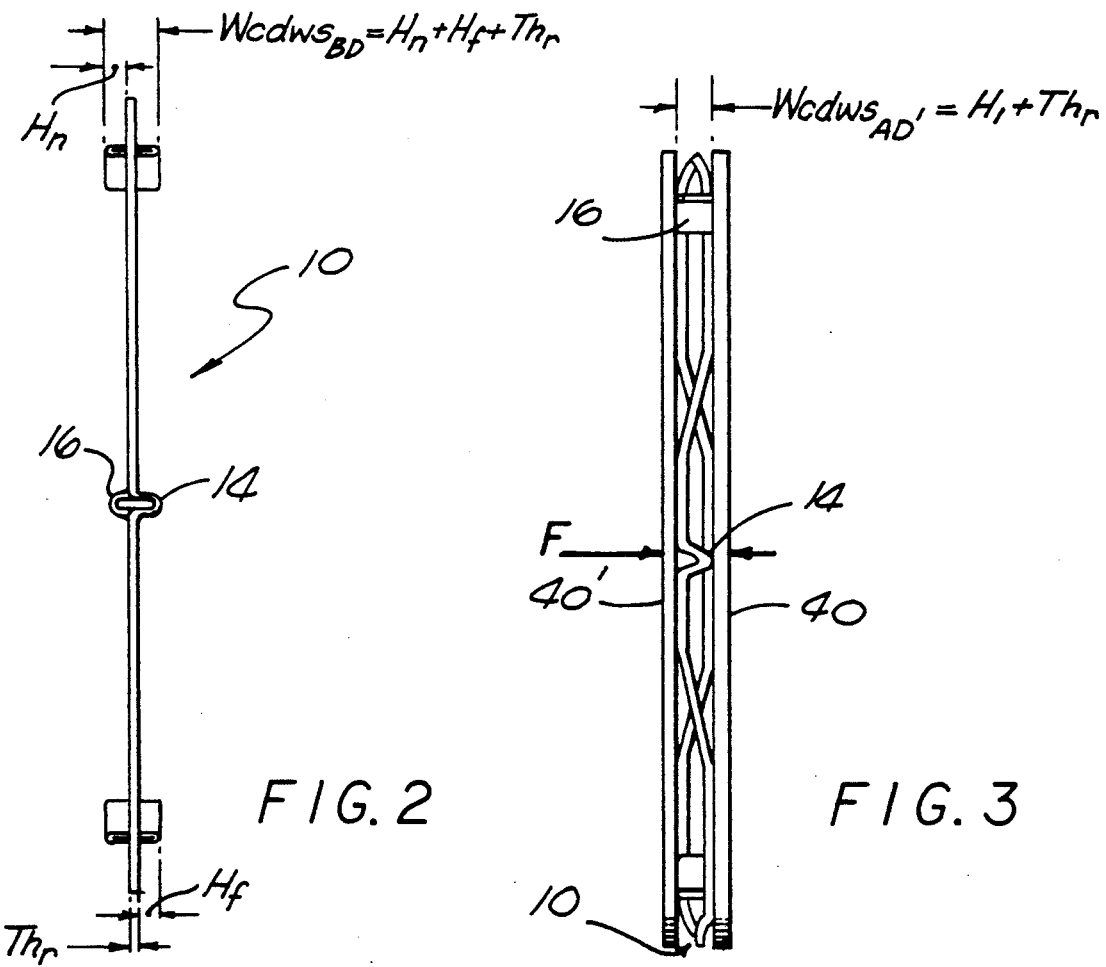
FIG. 2
FIG. 3

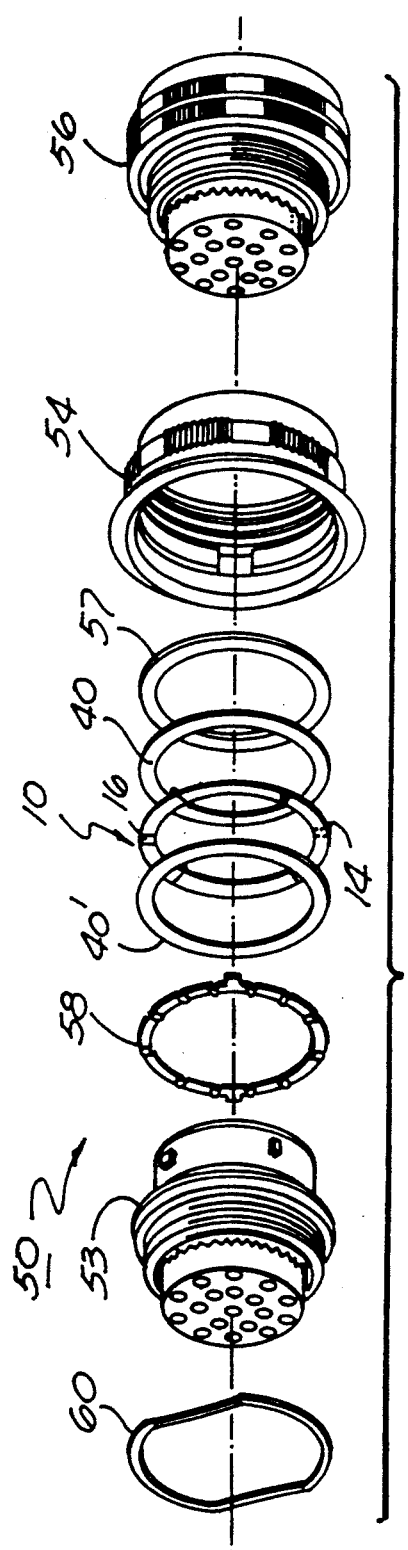
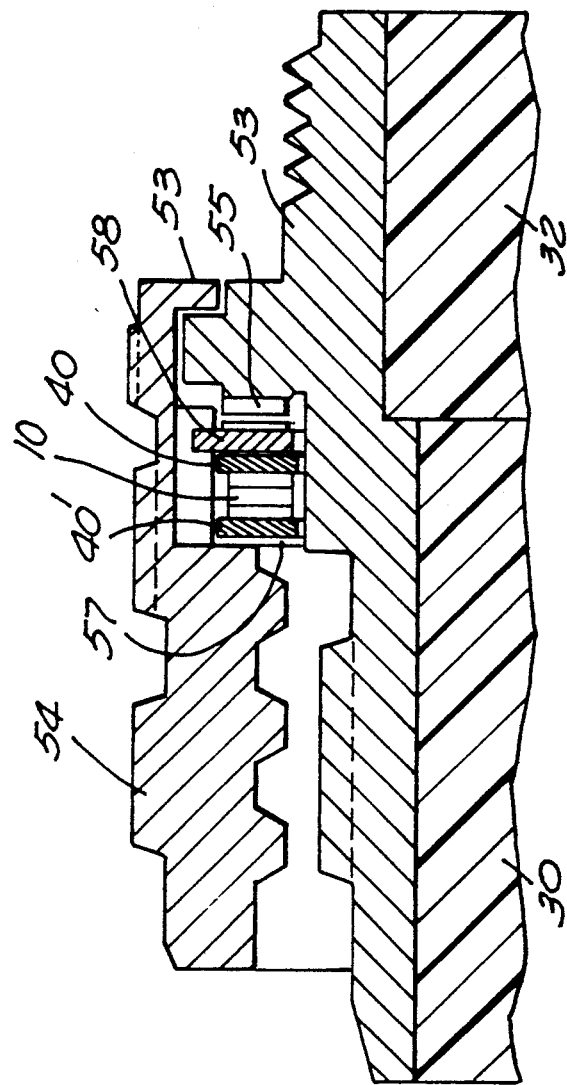
FIG. 4
FIG. 5

WAVE SPRING HAVING UNIFORMLY POSITIONED PROJECTIONS AND PREDETERMINED SPRING

RELATED APPLICATION

This application is a continuing application of pending prior application Ser. No. 07/647,956 filed Jan. 30, 1991 now abandoned.

BACKGROUND OF THE INVENTION

The present invention relates to a wave spring and more particularly to a wave spring having uniformly positioned surface projections and a predetermined specific spring tension with improved deflection capability.

Wave springs, having non-uniform surfaces, have been fabricated.

U.S. Pat. No. 2,431,120 issued to E. E. Howe Nov. 18, 1947 entitled "Joint for Tubing" discloses a conic thrust plate held in place by a series of springs wherein the springs employ a corrugated washer. This corrugated spring washer, while split, is circular in configuration and comprises a multiplicity of random dimples or individual waves within the surface of the corrugated washer. The washer in this application is used in high pressure joints for tubing or pipes having thin walls thereby providing a flexible connection for tubing including an elastic compressible sealing cushion member.

U.S Pat. No. 4,711,434 issued to D. L. Haag Dec. 8, 1987 entitled "Spring Disk", discloses a solid spring disk made of a resiliently yieldable material shaped into a shallow cone having a corrugated surface defined by a plurality of angularly spaced triangular segments of identical size and shape disposed together upon the surface of the cone in a side-by-side arrangement. The solid spring disk of this device provides an improved spring disk which when compared with springs of the same linear force of deflection are smaller in size and require less material for fabrication. The Haag patented spring is a solid spring and is not a washer.

U.S. Pat. No. 3,748,888 issued to A. J. Gerich Jul. 31, 1973 entitled "Bi-metallic Snap Disk and Method and Apparatus for Making Same" discloses a snap disk having peripherally spaced radially extending scallops which stiffen the disk independent of the cord height of the disk.

This bi-metallic snap disk of the Gerich patent has two positions of mechanical stability. When the temperature of the snap disk is below a predetermined temperature which has been determined during the manufacturing stage, the disk exhibits one position of stability. When the temperature of the disk is raised to a second predetermined temperature or greater, the disk snaps into a second predetermined position of stability and remains in that second position of stability until the temperature the disk is subjected to drops below the second predetermined temperature. The inventive concept of the Gerich snap disk does not describe a washer format.

U.S. Pat. No. 4,668,106 issued to A. L. Gu on May 26, 1987, entitled "Thrust Bearing Underspring", discloses a foil thrust bearing underspring having alternate upper ridges and lower ridges wherein the upper ridges have a height greater than the lower ridges. The Gu device is fabricated using strict tolerances thereby producing a device having a predetermined spring capability. This resiliency or spring rate of the underspring is varied by changing the thickness of the upper and lower ridges. The space that occurs between the adjacent lower ridges has a marked effect on the stiffness of the spring. The stiffness of the spring generally outwardly converges in order to better accommodate hydrodynamic pressure forces which increase radially upon the spring.

A second patent to A. L. Gu, U.S. Pat. No. 4,871,267, issued Oct. 3, 1989 entitled "Foil Thrust Bearing", discloses a gas bearing including an integral thrust bearing underspring defining a plurality of foil ridged elements. This thrust bearing underspring includes a plurality of upper ridges and lower ridges alternately, transversely disposed on the disk providing a pre-load support for the thrust disk. In an alternative embodiment of the disk, a plurality of radially outwardly extending tabs locally increase the flexural rigidity of the disk.

U.S. Pat. No. 4,082,375 issued to W. E. Fortmann Apr. 4, 1978 entitled "Dual Wedge Fluid Thrust Bearing Including Wave Spring", discloses a thrust bearing having in a spaced relationship a wave spring supporting both a thick, flexible plate and a thin, flexible plate stacked between the cooperating bearing surfaces of those members. This support wave spring is corrugated and in function is operable to support the plate as it overhangs the spring pad at a leading edge.

Finally, U.S. Pat. No. 3,375,046 issued to D. J. Marley Mar. 26, 1968 entitled "Foil Thrust Bearing Arrangements", discloses an improved thrust bearing for a gas lubricated type bearing having foil inserts placed in the bearing region. This thrust bearing eliminates the distortion problems in bearing components due to lax manufacturing tolerances. The individual foil inserts are convoluted providing the bearing with added resilience and depth materially improving the operating characteristics of the bearing. The foils are used in a plurality, with twin edges affixed to the plate and rings disposed relative to the central axis extending around the plate in a circumferential manner.

The wave spring used as a retaining means within an electrical connector, particularly in the connector coupling ring, has a spring deflection which is variable based upon the manufacturing tolerances of that spring and the amount of compression to which it is subjected.

The wave spring in its current design is unable to maintain a predetermined deflection and is inconsistent in its ability to be manufactured to specific spring tension requirements.

The wave spring commonly used in the fabrication of electrical connectors is operable to be fabricated inexpensively. However, its inconsistency in its ability to maintain deflection and inconsistency in its ability to be manufactured to a specific tension requirements limits its use.

SUMMARY OF THE INVENTION

The present invention, a wave spring having uniformly positioned surface projections and predetermined spring tension resolves the problem of the standard wave spring's inability to maintain spring tension. Also, the present invention is better able to maintain a consistent spring deflection over an extended period of time.

This invention produces a wave spring having a surface that is manufacturable in a controlled manner having consistently reliable characteristics.

The invention provides a control deflection wave spring comprising a washer, having a first and second side. This washer also has a predetermined radial width, thickness, internal diameter and external diameter and at least one top projection on the top surface of the washer, each of these projections having a predetermined height, and at least one bottom projection on the bottom surface of the washer wherein each of these bottom projections also has a predetermined height. The top and bottom projections are not compressible under load, and upon being placed under load the washer width is reduced or deflected to the height of the larger of the two projections, plus the thickness of the metal.

A wave spring having uniformly positioned top and bottom surface projections and a predetermined spring tension deflection for an electrical connector particularly in the coupling ring is also disclosed.

A wave spring having uniformly positioned top and bottom surface projections and a predetermined spring tension operable for use in composite and tooled metal bayonet or non-bayonet style electrical connectors is disclosed.

A method of fabrication for a wave spring having uniformly positioned surface projections and predetermined spring tension is also described for a variety of materials including, but not limited to, beryllium copper, 17-7 ph stainless steel, 316 stainless steel, composite material with long fiber filler such as graphite or glass, and high carbon spring steel.

BRIEF DESCRIPTION OF THE DRAWINGS

A complete understanding of the present invention and the above advantages may be gained from a consideration of the following description of the preferred embodiments taken in conjunction with the accompanying drawings in which:

FIG. 1 is a schematic representation top plan view of the wave spring having uniformly positioned surface projections;

FIG. 2 is a schematic representation side view of the wave spring having uniformly positioned surface projections prior to spring deflection;

FIG. 3 is a schematic representation side view of the wave spring having uniformly positioned surface projections undergoing pressured deflection between two washers;

FIG. 4 is an exploded orthogonal view of a standard swaged electrical connector having a wave spring with uniformly positioned surface projections; and FIG. 5 is a partial cross-sectional view of a standard swaged electrical connector having a wave spring with uniformally positioned surface projections.

DETAILED DESCRIPTION

The invention, a wave spring having uniformly positioned surface projections consists of a washer of known material having a predetermined modulus incorporating a top and a bottom surface which has a predetermined radial width, thickness, internal diameter and external diameter. This washer is a complete annular ring without breakpoint. At least one surface projection is implemented into the top surface in a predetermined position and at a predetermined height, opposing at least one surface projection on the bottom surface of the same washer. This bottom surface projection also has a predetermined height and position.

A wave spring having these uniformly positioned projections in the radial wall surfaces is configured such that the number of projections within the top and bottom radial wall surfaces affects the spring force in the given diameters of the radial wall providing a known spring force result. This system of projections shaped into the wave spring top and bottom radial wall surfaces is not unlike a cantilevered beam. Each section of the ring defined as the segment between the projections provides a cantilevered beam support to any planar surfaces which encounter the ring. Any planar surface placed in contact with the wave spring is thereby subjected to the ring's deflection. Wave spring equations well known in the art and available from machinery handbooks are used to calculate the spring force in pounds produced by the wave spring of a specified configuration. The projections are shaped to be not' compressible under load, and the washer is deflectable up to the height of the smaller of the top surface projections and the bottom surface projections.

Factors determinative in calculating the spring force of the wave spring having surface projections include the spring's internal and external diameters, the radial wall width, the height of the projections creased into the spring's radial wall top and bottom surfaces, the number of projections within the full circle of the radial wall such that one half of the projections are on one surface of the wall and the other half are on the opposing surface, and the specific spring material incorporated into the washer.

A method of consistently producing a predetermined spring force for each wave spring having uniformly positioned surface projections can be calculated using these predetermined factors.

In FIG. 1, is a schematic representation top plan view of the wave spring having uniformly positioned surface projections. The wave spring 10 is an annular washer of known thickness, having a radial wall 12 and width R. This radial wall 12 width R is consistent for the entire annulus of the ring. A multiplicity of top and bottom surface projections are incorporated into the surface of the radial wall 12. These projections such as the near side projection 16 and the far side projection 14 have predetermined heights. The predetermined heights as well as other factors in the composition of the ring are calculable to produce a known spring tension.

In this specific example of FIG. 1, the internal diameter of the ring is 1.14 inches, the external diameter (DO) is 1.26 inches and the combined number of top surface and bottom surface projections as shown here is six.

For the specific embodiment of FIG. 1, the equation to calculate for the spring tension deflection in inches f for a given load of known pressure in pounds P is as follows:

$$P = \frac{f \times E \times R \times t^3 \times N^4}{K \times D_m^3} \times \frac{D.O.}{D.I.}$$

Where:
f = deflection in inches
E = modulus of the material
R = radial width in inches
N = number of projections on one side
K = spring constant
$D_m$ = diameter of spring—mean diameter in inches
t = thickness of washer, in inches
P = load, in pounds For the embodiment of FIG. 1 where f = 0.04 inches, R = 0.06 inches, t = 0.015 inches, N = 3, $D_m$ = 1.2 inches, K = 3.88, D.I. = 1.26 inches, D.O. = 1.14 inches, and $E = 29.5 \times 10^6$ (17-7 pH), psi and using spring constant $K = 3.88$ solution of the problem for load P results in 3.1 pounds. This is exemplary of only one embodiment for one specific geometry and washer material.

However, changing the material comprising the wave spring and the other elements of the equation will produce varying load limit changes and deflection capabilities.

This example of FIG. 1 incorporates 17-7 ph stainless steel, having a modulus of material equal to $29.5 \times 10^6$, psi and a spring constant $K = 3.88$. Other materials may be used to fabricate the wave spring. These materials form a group, including but not limited to, beryllium copper having a material modulus of $18.4 \times 10^6$, 316 stainless steel having a material modulus of $28 \times 10^6$, composite material with long fiber filler (such as graphite or glass) having a material modulus of $0.18 \times 10^6$ and high carbon spring steel having a material modulus of $30 \times 10^6$. Spring constant K varies dependent upon the modulus of the material used.

The wave spring as described in FIG. 1 would be plated where corrosion would be a problem. The use of high carbon spring steel or beryllium copper alloy would necessitate the plating of the wave spring with uniformly positioned surface projections. A wave spring with uniformly positioned surface projections fabricated of 316 stainless steel, 17-7 ph stainless steel, or a composite material with long fibers would not require plating of the wave spring prior to use in a high corrosive environment.

The wave spring as illustrated in FIG. 2 is incorporated into metal tooled and composite electrical connectors. The wave spring with uniformly positioned surface projections is a feature of the coupling ring whenever spring tension requires the precise knowledge of the spring force exerted by the wave spring. Any self-locking mechanism of the standard threaded or bayonet electrical connector benefits from calculable consistent performance of the wave spring having uniformly positioned surface projections.

FIG. 2 is a schematic representation side view of a wave spring having uniformly positioned surface projections in an undeflected state; each projection is creased into the otherwise planar washer, being formed to have essentially axial side sections and minimal circumferential distance, such a formation not being compressible when the washer is compressed between opposing load surfaces under loads to be expected to be found in manually coupled connectors. In FIG. 2, the controlled deflection wave spring 10 has projections on the far side 14 and projections on the near side 16 where the near side height of the deflection projections is $H_n$ and the far side height is $H_f$. The individual thickness t of the radial wall is shown as $Th_r$. The overall width of the controlled deflection wave spring including the thickness of the radial wall and the height of the deflection projections for the near side and far side before deflection (BD), may be found by the equation $Wcdws_{BD} = H_n + H_f + Th_r$.

FIG. 3 is a schematic representation side view of the wave spring having uniformly positioned surface projections subjected to deflection or predetermined pressure load, in this example, between two compression washers. The wave spring 10 has "creases" or projections on the far side 14 and projections on the near side 16. The wave spring is illustrated at rest between two flat compression washers 40 and 40'. In actual use these two compression washers used in an electrical connector, bayonet style or self-locking threaded, with the controlled deflection wave spring 10 are subjected to high force loads. The high force loads result in deflection of the two washers 40, 40' as well as the wave spring 10 pressed between them. With the larger of $H_n$ and $H_f$ being identified as $H_1$ and the smaller identified as $H_2$, the washer is deflectable up to the height $H_2$ of the smaller projections. The after deflection width of the spring as it is responsive to the loads it is subjected to, wherein $Wcdws_{AD}$ (after deflection) equals the height of the longer of the two projections and thickness of the radial wall, $Wodws_{AD} = H_1 + Th_r$.

FIG. 4 is an orthogonal exploded view of a standard swaged type electrical connector having a wave spring with surface projections. Swaged electrical connector 50 contains a first shell 56, second shell 53 having keys 51 and swage style locking coupling ring 54. The prior art wave spring has been replaced here with a wave spring 10 having uniformly positioned surface projections 16, 14. The wave spring 10 is sandwiched between a first compression washer 40' and in second compression washer 40. The ratchet type clutch plate 58 interfits the keyway of the coupling ring 54 and cooperatively associates with the first compression washer 40' against wave spring 10. The second compression washer 40 is positioned between the wave spring 10 and rear friction washer 57. The rear friction/lock washer 60 is inserted after assembly of the connector 50.

FIG. 5 is a partial cross sectional view of a standard electrical connector having a wave spring with uniformly positioned surface projections. Second shell 53 having keys 51 lockingly engages swaged locking coupling ring 54 having swage 52. A ratchet 55 on the second shell 53 engages a clutch plate 54. The clutch plate 58 applies force F to a first flat compression washer 40 when the coupling ring 54 is tightened. Subsequent application of force to the coupling ring 54 compresses the wave spring 10 and the second flat compression washer 40'. Rear friction washer 57 completes the compression package applied against the wave spring 10 under the pressure of force, F. A first insert 30 and a second insert 32 are enclosed within second shell 53 and are shown here.

While particular embodiments of the invention have been shown and described, it will be obvious to those skilled in the art the changes and modifications may be made without departing from the invention in its broader aspects and therefore the aim in the appended claims is to cover all such changes and modifications as found in the true spirit and scope of the invention.

What is claimed:

1. A spring having uniformly positioned surface projections and predetermined spring tension deflection, comprising:
   (a) a washer disposed substantially in a common plane when unstressed and having a top and a bottom surface, said washer having a predetermined radial width, thickness, internal diameter, material modulus and external diameter;
   (b) said top surface including at least one top surface projection extending upwardly therefrom each at a respective selected position therearound;
   (c) said bottom surface including at least on bottom surface projection extending downwardly therefrom each at a respective selected position therearound remote from a said angular position of any said top projection; and (d) each said top and bottom surface projection being substantially incompressible under load, whereby said washer is deflectable under load between opposing parallel surfaces urged toward each other a distance not greater than the lesser of said predetermined heights to a spacing at least equal to the metal thickness plus the greater of said predetermined heights to assume a wave shape and is operable to provide and consistently maintain a spring tension deflection in response to a given load.

2. A wave spring having uniformly positioned surface projections and predetermined spring tension deflection as in claim 1 wherein said washer further comprises beryllium copper alloy.

3. A wave spring having uniformly positioned surface projections and predetermined spring tension deflection as in claim 1 wherein said washer further comprises 17-7 ph stainless steel.

4. A wave spring having uniformly positioned surface projections and predetermined spring tension deflection as in claim wherein said washer further comprises 316 stainless steel.

5. A wave spring having uniformly positioned surface projections and predetermined spring tension deflection as in claim 1 wherein said washer further comprises composite material having long fiber filler.

6. A wave spring having uniformly positioned surface projections and predetermined spring tension deflection as in claim 5 wherein said long fiber filler is graphite.

7. A wave spring having uniformly positioned surface projections and predetermined spring tension deflection as in claim 5 wherein said long fiber filler is glass.

8. A wave spring having uniformly positioned surface projections and predetermined spring tension deflection as in claim 1 wherein said washer further comprises high carbon spring steel.

9. A wave spring having uniformly positioned surface projections and predetermined spring tension as in claim 1 wherein said spring tension deflection in inches for a given load of known pressure in pounds is calculated by:

$$P = \frac{f \times E \times R \times t^3 \times N^4}{K \times D_m^3} \times \frac{D.O.}{D.I.}$$

Where:
 f = spring deflection, in inches
 E = modulus of the washer, psi
 R = radial width of the washer in inches
 N = number of projections on top or bottom of the washer surface
 K = a known constant
 $D_m$ = mean diameter of the washer in inches
 P = load, in pounds
 D.O. = outside diameter of washer in inches
 D.I. = internal diameter of washer in inches 10. A spring as set forth in claim 1 wherein each said top and bottom surface projection extends radially between said inside diameter and said outside diameter.

11. A spring as set forth in claim 1 wherein said top surface contains three said top surface projections spaced approximately equally about said washer, and said bottom surface contains three said bottom surface projections spaced approximately equally about said washer.

12. An electrical connector assembly of the type having matable electrical connectors which are each of the type having a terminal-containing insert retained within a shell, at least one of which is of the type in which the shell includes a first part axially movable toward a second part and against a spring means therewithin upon axial mating to assure biased engagement with the other connector, the connectors further being of the type whose shells are rotated during connector mating from an uncoupled position to a coupled position, the spring means of said one connector comprising:

(a) a spring washer disposed between first and second annular washer means disposed between annular flange means of said first and second shell parts of said connector;

(b) said spring washer disposed substantially in a common plane when unstressed and having a top and a bottom surface, said washer having a predetermined radial width, thickness, internal diameter, material modulus and external diameter;

(c) said top surface including at least one top surface projection extending upwardly therefrom each at a respective selected position therearound;

(d) said bottom surface including at least one bottom surface projection extending downwardly therefrom each at a respective selected position therearound remote from a said selected position of any said top projection; and (e) each said top and bottom surface projection formed into a shape to be substantially incompressible under load, whereby said washer is deflectable under load between said first and second annular washer means having been urged toward each other a distance no greater than said predetermined height of the smaller of the top and bottom surface projections to a spacing at least equal to the thickness of the metal plus said predetermined height of the longer of said top and bottom surface projections to assume a wave shape and is operable to provide and consistently maintain a spring tension deflection in response to a given load.

13. A method of providing a spring having uniformly positioned surface projections and predetermined spring tension deflection, said method comprising the steps of:

(a) providing a washer disposed substantially in a common plane when unstressed and having a top and a bottom surface, said washer having a predetermined radial width, thickness, internal diameter, material modulus, external diameter and natural modulus;

(b) providing on said top surface at least one top surface projection extending upwardly therefrom each at a respective selected position therearound;

(c) providing on said bottom surface at least one bottom surface projection extending downwardly therefrom each at a respective selected position remote from a said selected position of any said top surface projection; and (d) each said top and bottom surface projection formed into a shape to be substantially incompressible under load.

14. A method providing a spring having uniformly positioned surface projections and a predetermined spring tension deflection (f), said method comprising the steps of:

(a) providing a washer having a top and a bottom surface, said washer having a predetermined radial width (R), a mean diameter ($D_m$), outside diameter (D.O.), inside diameter (D.I.), modulus of material (e), thickness (t), and spring constant (k), said washer operable to provide a spring tension deflection (f) in response to a given load (P);

(b) providing at least one radially extending top surface projection (n), each said top surface projection on said top surface of said washer having a predetermined height ($H_n$); and (c) providing at least one radially extending bottom surface projection (n), each said bottom surface projection on said bottom surface of said washer having a predetermined height ($H_f$), each said top and bottom surface projection being formed into a shape to be substantially incompressible under load; and (d) providing a given load (p) to said at least one top surface projection and said at least one bottom surface projection of said washer;

whereby said washer is deflectable under load between opposing parallel surfaces urged toward each other a distance no greater than the lesser of $H_n$ and $H_f$ to a spacing W at least equal to the thickness of the metal (t) plus the greater of $H_n$ and $H_f$ to assume a wave shape and is operable to provide and consistently maintain said spring tension deflection which may be calculated:

$$P = \frac{f \times E \times R_3 \times t^3 \times N^4}{K \times D_m} \times \frac{D.O.}{D.I.}$$

15. A method as set forth in claim 14 wherein said providing of at least one top surface projection comprises providing three said top surface projections spaced approximately equally about said washer, and said providing of at least one bottom surface projection comprises providing three said bottom surface projections spaced approximately equally about said washer.

16. A method as set forth in claim 14 wherein each said top and bottom surface projection is formed to extend radially between said inside diameter and said outside diameter.

17. A method as set forth in claim 13 wherein each said top and bottom surface projection is formed to extend radially between said inside diameter and said outside diameter.

18. A method as set forth in claim 13 wherein said providing of at least one top surface projection comprises providing three said top surface projections spaced approximately equally about said washer, and said providing of at least one bottom surface projection comprises providing three said bottom surface projections spaced approximately equally about said washer.

19. An electrical connector assembly as set forth in claim 12 wherein said one connector is a bayonet connector.

20. An electrical connector assembly as set forth in claim 12 wherein said one connector is a threaded self-locking connector.

21. An electrical connector assembly as set forth in claim 12 wherein said spring washer is placed under load applied by a flange means of a coupling ring of said shell of said one connector upon being threadedly tightened to corresponding thread means of the shell of the other said connector, against a flange means of said shell.

* * * * *